United States Patent Office 2,798,757
Patented July 9, 1957

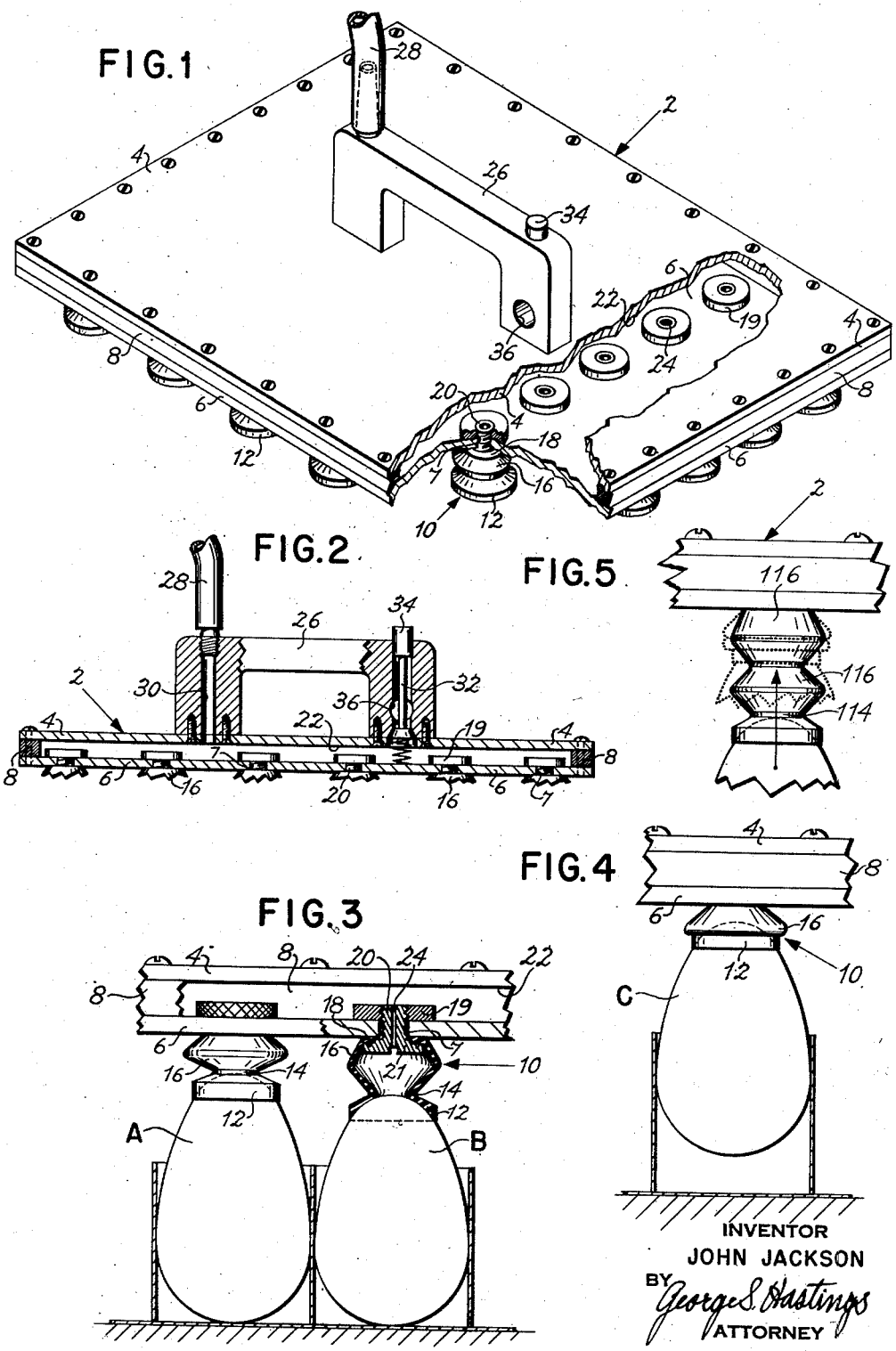

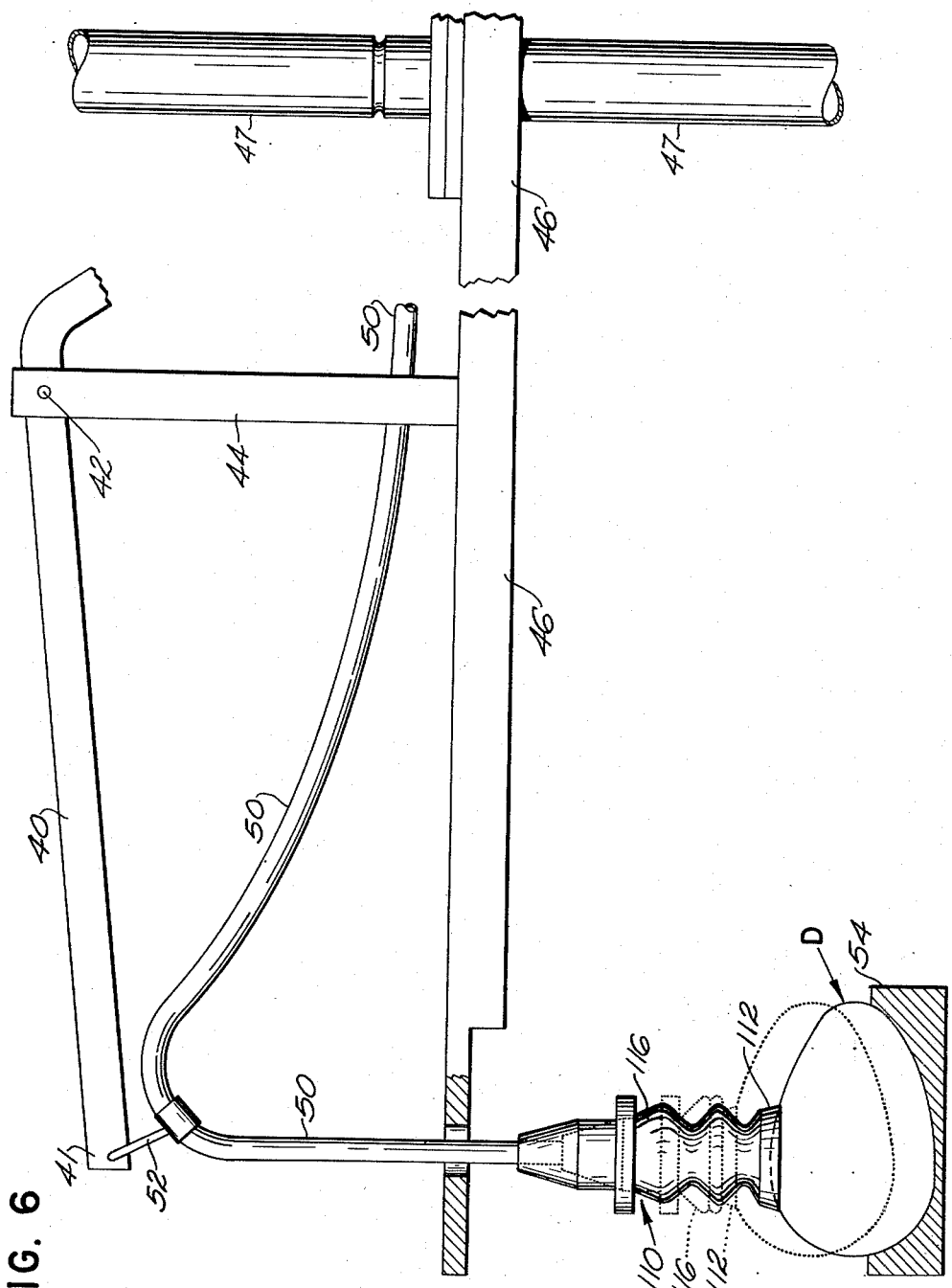

2,798,757
ARTICLE LIFTING DEVICE

John Jackson, Brooklyn, N. Y., assignor to American Machine & Foundry Company, a corporation of New Jersey Application February 23, 1951, Serial No. 212,308

15 Claims. (Cl. 294—64)

This invention relates to improvements in article handling and lifting apparatus. It is more particularly designed for grasping, lifting and transferring groups of small variable sized articles, such as eggs.

The general object of the invention is to provide resilient suction chucks, simple and economical of construction, which will automatically pick up articles of varying height.

It is a further object of this invention to attach these chucks to a frame. By placing the frame over a plurality of articles, such as eggs, each chuck adapts itself to contact an egg whether the egg be large or small.

Eggs are normally crated in wood or cardboard cases in layers of thirty-six eggs each. These layers are horizontally separated by cardboard "flats." Vertical cardboard cubicles, known as "fillers," separate the individual eggs in a layer.

Each layer of eggs is normally uncrated by hand. There are several methods for doing this. In one, fillers can be removed and the eggs picked up by hand. This method is slow. A second method is for one operator to remove an entire flat of eggs with the filler in place. A second operator removes the eggs and filler from the flat—usually by "forking." This consists of passing the tines of a specially designed fork beneath and between the rows of eggs to support the eggs while the filler is stripped off. This latter procedure, while faster, has several disadvantages. Occasionally a large egg sticks in the filler, is lifted with it to then fall and break. Moreover, the operation requires two men, the one to lift the flat from the carton and the other to "fork" or otherwise remove the eggs from the flat.

It is commonly known in the industry that a certain skill or deftness, not found in all workers, is required to lift flats from the crate and even the most deft worker can only work about a week at a time because the backs of his hands rub raw against the sides of the crates.

With my invention, the frame with the resilient cups is placed over the eggs in the crate. A suction cup contacts each egg so that the entire layer may be lifted. While the eggs are so held beneath the frame the filler may be stripped from them or left on for removal later. The operator may then directly deposit them where desired. This procedure requires only one operator and no particular deftness.

A further object of the invention is to provide a simple improved mounting principle for the suction cup. This comprises a bellows-shaped resilient member which I have found supplies the desired adjustability enabling the cups to contact eggs securely and without danger of breakage.

Still another object of the invention is to provide a longitudinally collapsible mounting member for the suction gripper which, when the cup engages the article and vacuum is applied, moves the cup and the article along a distance between the maximum length of the mounting member and its minimum longitudinal length when collapsed. The contraction of the bellows-shaped resilient portion draws the article securely and rigidly to the frame, so that subsequent movement of the frame will not cause individual articles to swing against each other, which, in the case of eggs, may cause breakage.

The invention comprises the structure of the bellows-shaped member and the lifting rack combination made possible thereby, as more particularly described in the following detailed embodiment of the invention.

In the accompanying drawings:

Fig. 1 is a perspective view with parts broken away to illustrate the arrangement and construction of the assembled lifting rack;

Fig. 2 is a sectional side elevation showing the vacuum or suction chamber and control valve;

Fig. 3 is a partial side elevation of the lifting rack while engaging with eggs of different sizes;

Fig. 4 is a side elevation of a single suction cup illustrating the collapsing of the cup and the consequent lifting effect upon the egg when vacuum is applied;

Fig. 5 is a side elevation of another embodiment illustrating the use of multiple bellows and the consequent greater lifting effect on the egg when vacuum is applied; and Fig. 6 is a partial sectional side elevation of an egg-grading turntable mechanism.

Referring to Fig. 1, the rack 2 consists of a top and bottom plate 4 and 6 respectively mounted to the top and bottom side of a suitable frame or gasket 8 so as to form an air-tight chamber. The bottom plate 6 has a plurality of holes 7 arranged as desired. At each of these holes is secured a chuck 10 composed of a flexible material and consisting of a cup portion 12 for contacting the egg, a constricted neck 14, 114 to give universal seating action to the cup, the resilient bellows-shaped portion 16, 116 and a mounting flange 18. The chuck 10 may be formed as a unitary casting of rubber or other resilient composition. Chucks 10 are mounted on plate 6 so as to form an air-tight seal by means of a threaded knurled nut 19 and a threaded screw 20, as illustrated in Fig. 3. An annular groove is provided in the under-surface of the head 21 of the screw 20 to obtain a perfect seal at this point.

The cavity of the cup and bellows is continuous and communicates with the rack chamber 22 by means of small ducts 24 through the screw 20.

The handle 26 is secured to the upper plate 4 in a suitable manner. Vacuum is applied to the chamber 22 by means of a tube 28 leading from a suitable vacuum pump (not shown) and the duct 30 running through one post of the handle 26. In the other post there is conveniently mounted a normally closed spring controlled valve 32. As illustrated in Fig. 2, button 34 secured to the valve stem protrudes above the handle where it may be depressed by the operator's thumb to open the valve. When the valve is opened the chamber 22 is bled by communication with the atmosphere via the valve and port 36.

Since eggs are normally crated in layers of thirty-six eggs arranged in six rows of six, I have accordingly positioned the chucks on my rack to correspond to such a thirty-six egg layer.

In operation, the rack 2 is placed on top of the layer of eggs so that each chuck 10 contacts an egg. Contact with each egg is obtained by yielding of the bellows 14. As illustrated at the left in Fig. 3 the bellows 14 yield to the egg A to permit the adjacent chuck 10 to contact the smaller egg B. When the cups are all seated on the respective eggs and the vacuum is applied the bellows will collapse as illustrated in Fig. 4 and in dotted lines in Fig. 5, thereby lifting the eggs.

Another embodiment of my invention is illustrated in Fig. 5 showing the multiple bellows 116. Occasionally crates may contain eggs that range all the way from "jumbo" to "peewee" size. A greater variation in article size may be provided for by the multiple bellows. As may be seen, these bellows are capable of greater automatic adjustability to the varying height of the articles. Also, where more lifting distance is required, the bellows, as shown in the dotted line position, will lift a greater relative distance.

The bores 24 are very small so that when several cups are not in suctional contact with an egg or article, there will still be operative suction in the other cups. Thus, if a layer has less than the full thirty-six eggs the apparatus will still lift the lesser number present. I have found a bore size of .040 inch very satisfactor for the particular rack herein shown.

The eggs are released when the operator opens the bleeder valve 32 illustrated here as a normally closed valve that may be opened by pressure of the thumb. Valve 32 is sufficiently large so that when it is opened the vacuum is destroyed and the eggs released.

It is to be understood that in my appended claims I intend by the use of the words "bellows" or "bellows-shaped" to include either variation, that is, a bellows having one or more convolutions.

My chuck may also be used on the weighing levers of grading machines, particularly the endless carrier or rotary type, having a series of lever balances on one end of which the egg is supported and from which it is deposited into one of a series of bins or conveyors depending upon the degree to which the weight of the egg depresses the lever balance as shown in the co-pending patent to Powell 2,606,658. When so used, the positive collapsing and contracting action of the bellows, when vacuum is applied, has the salutary effect of limiting the displacement of the weighing beam when the egg is picked up and so decreasing its settling time. The weighing beam as it approaches the egg at the pick-up position may be cammed down to a position higher than median. If a heavy egg is picked up the contraction of the bellows pulls down the weighing beam to its approximate resting position, whereas with a light egg, the egg is lifted to the beam. Then, as the beam rides off the cam, it need move through a comparatively small arc to reach equilibrium.

Referring to Fig. 6, weighing or balancing beam 40 is shown pivoted at 42 on post 44 of a rotary turntable 46 of the type such as is shown in the reference to Butterfield 2,139,574, dated December 6, 1948. The balance arm 40 carries at its free end 41 suction tube 50 secured by the strap 52. A chuck 110 having bellows 116 and a cup portion 112 is secured to the dependent end of suction tube 50. The turntable 46 is secured to rotating shaft 47. The egg D supported on means 54 is brought in contact with cup 112 of chuck 110 and the end 41 of balance arm 40 is guided down by a cam (not shown). As the cup 112 seats itself on the egg, suction is applied through the tube 50 collapsing the bellows 116. If the egg D be extremely heavy, balancing arm 40 is pulled downward toward the egg while the egg is still supported on the means 54, whereas if the egg is light, as shown in Fig. 6, it is lifted toward the balance arm and out of means 54. This effects a pre-setting of arm 40 to its approximate resting position. Accordingly, the settling time of arm 40 is reduced substantially to zero.

It may be readily appreciated that my chuck is adaptable for use with article handling machines or apparatus other than egg handling. It may be used in any suctional pick-up device where yielding contact or lift is sought or found beneficial or desirable.

It may be further understood that the embodiment herewith shown and described is a preferred example of my invention and various changes relative to size, shape and arrangement may be resorted to without departing from the spirit of the invention or the scope of the appended claims.

I claim:

1. A vacuum chuck for lifting small articles of varying heights comprising an operative article contacting vecuum disc and a compressible accordion bellows-shaped body portion operative in response to engagement with an article to collapse and move axially upwardly, the bellows-shaped body portion having a hollow interior in communication with the interior of the contact disc and means for connecting said hollow interior with a vacuum source so as to permit yielding contact with an article and whereby in response to said collapse of said body portion said article is lifted by said chuck.

2. In an article lifting apparatus, the combination of a portable supporting frame, a vacuum chamber in said frame, a vacuum source communicating with the chamber, a group of vacuum pick-up chucks secured to said frame and in communication with said chamber, each of said chucks comprising an article contacting suction cup and a resilient accordion bellows-shaped collapsible member constructed and arranged to collapse upon application of vacuum, said member being positioned between said frame and said cup to automatically adjust said cup to engage individual articles of varying height, and means for releasing the vacuum to disengage the articles from the cups.

3. In a vacuum chuck, suitable for use in an egg handling machine comprising an operative suction cup for contacting an egg, means suitable for securing the said chuck to a vacuum source, and an intermediate resilient accordion collapsible bellows operatively positioned between said cup and said securing means said bellows portion constructed and arranged to collapse when vacuum is applied to automatically lift the cup and the egg when suction is applied.

4. In an article lifting apparatus, the combination with a supporting frame of a vacuum chamber in said frame, a vacuum source communicating with the chamber, a group of vacuum pick-up chucks secured to said frame, said chucks comprising an article contacting suction cup and a resilient accordion bellows-shaped supporting member positioned between said frame and said cup to automatically adjust said cup to engage individual articles of varying height, a cavity in said member communicating with said suction cup, a bore communicating with said cavity and said chamber, each of said bores having a cross-sectional area sufficiently small to limit air flow therethrough to substantially below the displacement capacity of said vacuum source whereby the operation of other chucks is not impaired by the failure of at least one chuck to contact an article.

5. An article lifting apparatus as claimed in claim 4 further characterized in that the said supporting member is connected to the said cup by a hollow narrow neck to permit universal flexion between the member and the cup.

6. In an article lifting apparatus the combination with a supporting member, of a vacuum chamber in said member, a vacuum source communicating with the chamber, a group of suction grippers secured to said member, said grippers comprising an article contacting suction cup and a resilient vacuum contractible accordion-shaped bellows positioned between said member and said cup to automatically adjust said cup to engage an individual article of varying height, and means connecting said frame to said grippers providing an opening to communicate said grippers with said chamber.

7. In an egg handling apparatus the combination with a supporting frame, of a vacuum chamber in said frame, a vacuum source communicating with the chamber, a group of resilient vacuum pick-up chucks secured to said frame, said chucks comprising a suction disc and a vacuum collapsible accordion bellows supporting member positioned between said frame and said disc to automatically adjust said disc to engage an individual egg of varying height, a cavity in said member communicating with said suction disc at one end and with said chamber at the other end whereby the vacuum created in said chamber from said source is applied to said disc.

8. In combination, a vacuum conduit, a vacuum chuck comprising a contact disc and a hollow substantially horizontally pleated collapsible member constructed and arranged to collapse upon the application of vacuum, the chamber of said hollow member communicating with said cup at one end and said conduit at the other end so that when said cup contacts an article said hollow member may collapse to adjust the cup to the height of the article.

9. A vacuum chuck for lifting small articles of varying height, a continuous chamber throughout said chuck, said chuck comprising an operative contact vacuum disc and a longitudinally yielding body portion constructed and arranged to collapse upon the application of vacuum, said body portion having a multiple substantially horizontally pleated bellows-shaped configuration, means for communicating said interior chamber with vacuum source whereby when vacuum is applied the bellows-shaped body portion will collapse to shorten its length whereby articles suctionally engaged by said chuck are lifted.

10. In an article lifting device the combination with a movable supporting frame, a vacuum chamber in said frame, a source of vacuum communicating with the chamber, a group of vacuum pick-up chucks secured to said frame, and in communication with said chamber, each of said chucks comprising an article contacting suction cup and a longitudinally accordion pleated yielding body member interposed between said frame and said cup to automatically adjust said cup and engage an article of varying height, said body member having a vacuum chamber formed within and constructed and arranged so that said body members contracts longitudinally when vacuum is applied to said chamber and means for releasing the vacuum to disengage the articles from the cups.

11. In a device for lifting a plurality of articles, the combination with a supporting member, a plurality of suction grippers attached to said frame positioned in a predetermined geometric configuration corresponding to the predetermined position of articles to be lifted, a source of vacuum and means to apply said source of vacuum to said suction grippers, said grippers having an operative suction cup and a resilient accordion bellows-like portion constructed and arranged to collapse upon application of vacuum, said portion being positioned between said cup and said supporting member to permit said cup to have yielding contact with an article whereby when said cup engages an article and said vacuum is applied, said bellows-like portion will collapse to lift said article.

12. In an article weighing apparatus having a weighing arm on one end of which an article is supported, a vacuum chuck on the article supporting end of said arm whereby the article is supported, said chuck comprising an article contacting vacuum disc and a compressible resilient accordion bellows body portion, the bellows-shaped body portion having a hollow interior in communication with the interior of the contact disc, and means for connecting said hollow interior with a vacuum source to permit yielding contact with an article and to lift said article toward said weighing arm and to pull said weighing arm toward said article when vacuum is applied thereby to limit the displacement of the arm to decrease the settling time thereof.

13. In an article weighing apparatus having a weighing arm on one end of which an article is supported, a vacuum chuck on the article supporting end of said arm whereby the article is supported, said chuck comprising an article contacting vacuum disc and a compressible accordion resilient bellows-shaped body portion, the bellows-shaped body portion having a hollow interior in communication with the interior of the contact disc, and means for connecting said hollow interior with a vacuum source to permit yielding contact with an article and upon contact to lift said article toward said weighing arm and to pull said weighing arm toward said article thereby to limit the displacement of the arm to decrease the settling time thereof.

14. In a vacuum chuck suitable for use in an egg handling machine comprising an operative suction chuck for contacting an egg, means suitable for securing said chuck to a vacuum source, an intermediate resilient section secured to said chuck and said means and having two annular members connected peripherally with the inner faces of said members in spaced opposed relationship whereby when said suction chuck engages an egg and suction is applied thereto said opposed faces will move together substantially simultaneously with the gripping of an egg to lift said egg from a support surface.

15. In a vacuum chuck suitable for use in an egg handling machine comprising an operative suction chuck for contacting an egg, means suitable for securing said chuck to a vacuum source, an intermediate resilient section having two annular members connected peripherally with the inner faces of said members in spaced opposed relationship, said members forming a chamber and said chamber being in communication with said suction chuck and said means whereby when said suction chuck engages an egg and suction is created therein said opposed faces are moved together substantially simultaneously with the gripping of an egg to lift said egg from a support surface.

References Cited in the file of this patent

UNITED STATES PATENTS

| | | |
|---|---|---|
| 389,485 | Russell | Sept. 11, 1888 |
| 750,667 | Lewellyn et al. | Jan. 26, 1904 |
| 1,060,948 | Schuster | May 6, 1913 |
| 1,549,159 | Suhm | Aug. 11, 1925 |
| 1,987,336 | Powell | Jan. 8, 1935 |
| 2,204,738 | Swan | June 18, 1940 |
| 2,658,789 | Tellier | Nov. 10, 1953 |

FOREIGN PATENTS

| | | |
|---|---|---|
| 7,692 | Great Britain | Apr. 7, 1908 |